United States Patent
Rakshit et al.

(10) Patent No.: US 9,921,651 B2
(45) Date of Patent: Mar. 20, 2018

(54) VIDEO DISPLAY FOR VISUALLY IMPAIRED PEOPLE

(71) Applicant: INTERNATIONAL BUSINESS MACHINES CORPORATION, Armonk, NY (US)

(72) Inventors: Sarbajit K. Rakshit, Kolkata (IN); John D. Wilson, League City, TX (US)

(73) Assignee: International Business Machines Company, Armonk, NY (US)

( * ) Notice: Subject to any disclaimer, the term of this patent is extended or adjusted under 35 U.S.C. 154(b) by 96 days.

(21) Appl. No.: 14/699,943

(22) Filed: Apr. 29, 2015

(65) Prior Publication Data

US 2016/0320841 A1 Nov. 3, 2016

(51) Int. Cl.
*G06F 3/01* (2006.01)
*G06F 3/033* (2013.01)
(Continued)

(52) U.S. Cl.
CPC ............... *G06F 3/016* (2013.01); *G06F 1/16* (2013.01); *G06F 3/014* (2013.01); *G06F 3/033* (2013.01);
(Continued)

(58) Field of Classification Search
USPC .................................................. 434/112–114
See application file for complete search history.

(56) References Cited

U.S. PATENT DOCUMENTS

| 8,743,052 B1 * | 6/2014 | Keller ..................... G06F 3/014 345/156 |
| 2010/0302199 A1 * | 12/2010 | Taylor ..................... G06F 3/046 345/174 |

(Continued)

FOREIGN PATENT DOCUMENTS

WO   WO 2015054789 A1 *  4/2015  ........... G09B 21/003

OTHER PUBLICATIONS

AAAS, Science NetLinks, "Build and Electromagnet", http://sciencenetlinks.com/student-teacher-sheets/build-electromagnet/, Copyright 2015, pp. 1-3.
(Continued)

*Primary Examiner* — Jennifer Mehmood
*Assistant Examiner* — Deeprose Subedi
(74) *Attorney, Agent, or Firm* — Tutunjian & Bitetto, P.C.; Kurt Goudy

(57) ABSTRACT

A system and method are provided for presenting video content to a user. The method includes displaying video content on a visual display layer of a display device. The method further includes tracking, by a video processor, at least one object of interest in the video content. The method also includes embossing, based on respective positions of the at least one object, the at least one object on a microfluidics panel surface layer of the display device. The method additionally includes magnetizing, based on the respective positions, one or more portions of magnetic material in a magnetic material mesh layer of the display device to create respective temporary magnetics at the one
(Continued)

or more portions that emit respective magnetic fields detectable by at least one user-wearable magnetic ring device held proximate to the display device. The respective magnetic fields indicate at least a movement of the at least one object.

18 Claims, 10 Drawing Sheets

(51) Int. Cl.
  *G06F 3/041* (2006.01)
  *G06K 9/00* (2006.01)
  *H04N 5/04* (2006.01)
  *G06F 1/16* (2006.01)
  *G09B 21/00* (2006.01)
  *H04N 5/64* (2006.01)
  *H04N 7/00* (2011.01)
  *G09G 3/36* (2006.01)

(52) U.S. Cl.
  CPC .......... *G09B 21/00* (2013.01); *G09B 21/003* (2013.01); *G09B 21/007* (2013.01); *G09G 3/3611* (2013.01); *H04N 5/64* (2013.01); *H04N 7/002* (2013.01); *G09G 2370/16* (2013.01)

(56) References Cited

U.S. PATENT DOCUMENTS

| | | |
|---|---|---|
| 2012/0274563 A1 | 11/2012 | Olsson |
| 2013/0044100 A1 | 2/2013 | King |
| 2014/0268515 A1 | 9/2014 | Smoot et al. |
| 2015/0220109 A1* | 8/2015 | von Badinski ......... G01P 15/00 340/539.12 |
| 2015/0310762 A1* | 10/2015 | Seim ...................... G09B 21/00 434/113 |
| 2015/0331528 A1* | 11/2015 | Robinson ............. G09B 21/004 345/173 |
| 2015/0338916 A1* | 11/2015 | Priyantha ................ G06F 3/017 345/173 |
| 2016/0224116 A1* | 8/2016 | Hagedorn ............ G09B 21/003 |
| 2016/0246370 A1* | 8/2016 | Osman .................. A63F 13/212 |

OTHER PUBLICATIONS

Demand Media Inc.,"Types of Temporary Magnets", http://www.ehow.com/how_5862853_make-temporary-magnet-using-electricity.html, Copyright 1999-2015, pp. 1-4.

Johnston, Casey, "Microfluids Panel Could Add Physical Buttons to a Touch Screen", http://arstechnica.com/ gadgets/2014/01/new-microfluidics-panel-could-add-physical-buttons-to-a-touch-screen/, Copyright 2015 Conde Nast, pp. 1-3.

CNN, "A Touch Screen with Keys that Rise and Disappear", http://whatsnextblogs.cnn.com/2012/08/06/a-touchscreen-with-keys-that-rise-and-disappear/, Copyright 2015, pp. 1-3.

* cited by examiner

VIDEO DISPLAY FOR VISUALLY IMPAIRED PEOPLE

BACKGROUND

Technical Field

The present invention relates generally to displaying video and, in particular, to a video display for visually impaired people.

Description of the Related Art

While systems exist to aid visually impaired people in walking and avoiding obstacles, there are no systems for displaying video for visually impaired people.

SUMMARY

According to an aspect of the present principles, a method is provided for presenting video content to a user. The method includes displaying the video content on a visual display layer of a display device. The method further includes tracking, by a video processor, at least one object of interest in the video content. The method also includes embossing, based on respective positions of the at least one object of interest, the at least one object of interest on a microfluidics panel surface layer of the display device. The method additionally includes magnetizing, based on the respective positions of the at least one object of interest, one or more portions of magnetic material in a magnetic material mesh layer of the display device to create respective temporary magnetics at the one or more portions that emit respective magnetic fields detectable by at least one user-wearable magnetic ring device held proximate to the display device. The respective magnetic fields indicate at least a movement of the at least one object of interest.

According to another aspect of the present principles, a system is provided for presenting video content to a user. The system includes a display device. The display device includes a visual display layer for displaying the video content thereon. The display device further includes a video processor for tracking at least one object of interest in the video content. The display device also includes a microfluidics panel surface layer for embossing the at least one object of interest thereon based on respective positions of the at least one object of interest. The display device additionally includes a magnetic material mesh layer formed of magnetic material such that one or more portions of the magnetic material is magnetized based on the respective positions of the at least one object of interest to create respective temporary magnetics at the one or more portions that emit respective magnetic fields. The respective magnetic fields indicate at least a movement of the at least one object of interest. The system further includes a user wearable magnetic ring device for detecting the respective magnetic fields when held proximate to the display device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to a video display for visually impaired people.

In an embodiment, a special type of hardware device (hereinafter "display device") is used to present video to visually impaired people. The visually impaired person can use one or both hands to feel the movement of a digital object(s) in the screen of the display device.

In an embodiment, the visually impaired person can use a wearable ring device(s) which is made of magnetic material. The visually impaired person can wear the ring device(s) on one or more of his/her fingers.

In an embodiment, a grid of magnetic material mesh can be installed below the display surface of the display device. Based on the current position(s) of the moving digital object(s) in the grid, a corresponding portion of the magnetic material can be converted into a temporary magnet.

As the visually impaired person is wearing the ring device (made of magnetic material), he/she will feel a pull force around the moving digital object(s).

Typically, video is played back at a frame rate of at least 24 frames per second. In an embodiment, the frame rate of the display device can be adjusted to any value. Thus, while video is being displayed in the display device, the frame rate can be reduced, so that user can synchronize his hand movement with the movement of the digital object(s). It is to be appreciated that any frame rate that the user can deal with can be used in accordance with the present principles. In an embodiment, the frame rate can be 1 frame per second. In an embodiment, the system can be trained automatically based on usage behavior in order to control the frame rate.

In an embodiment, a microfluidics panel surface can be overlaid over the display surface of the display device to emboss displayed objects on the screen of the display device. In such a case, the magnet pull force indicates the direction of object movement in the screen of the display device.

In an embodiment, the magnetic strength will be increased or decreased based on the speed of movement of any object, so the visually impaired person can realize the pull force and understand the corresponding object movement. For example, in an embodiment, the magnetic force will increase with increasing object speed of movement, and the magnetic force will decrease with decreasing object speed of movement.

In an embodiment, the user can also select an object(s) of interest, whereby the selected object(s) can then be embossed on the screen of the display device. Thus, for example, in the case of a football game being presented to the user, the user can define the football and the players as objects of interest.

Figure 1:
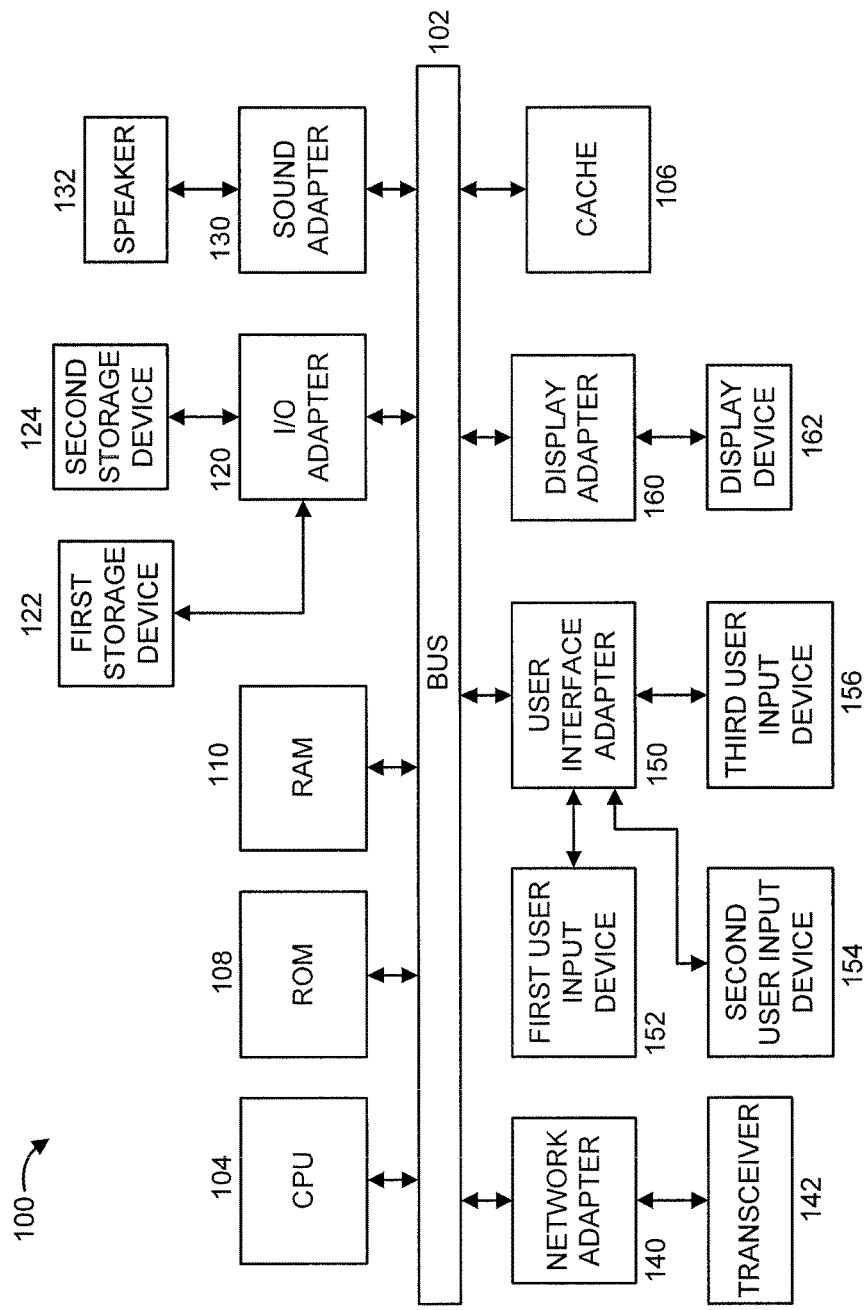
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
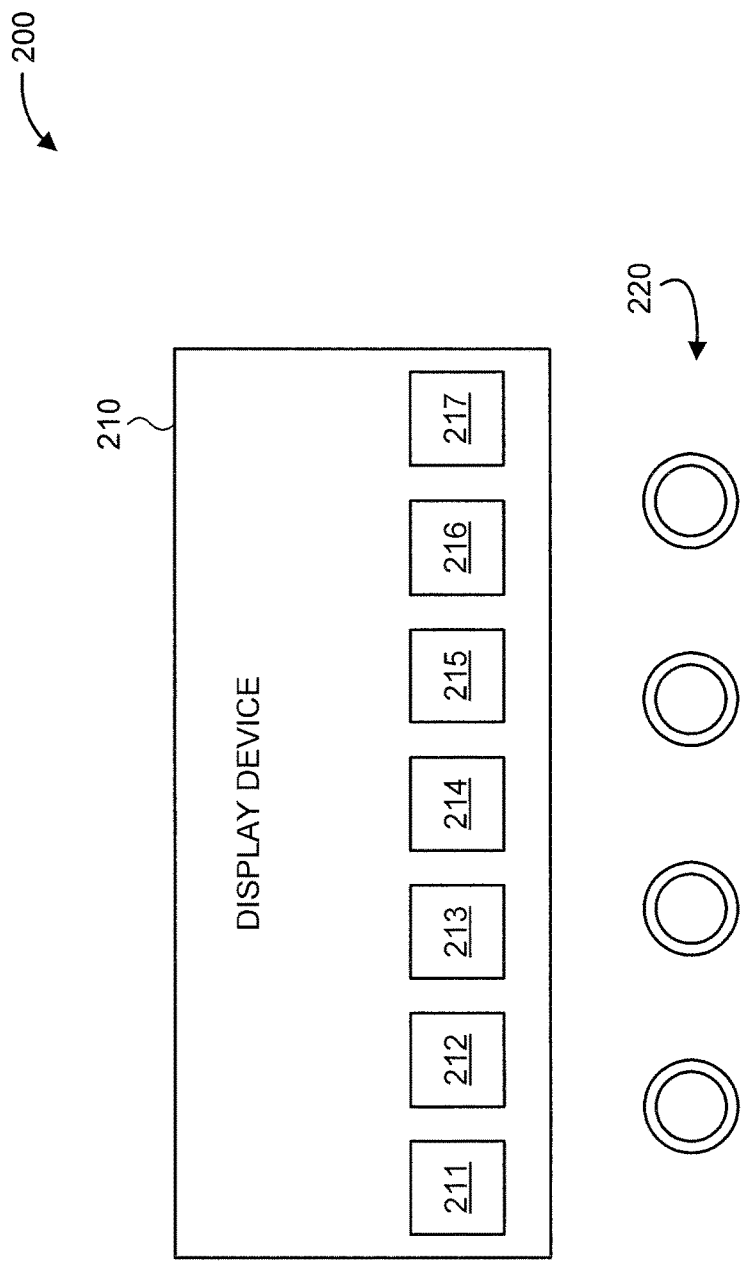
FIG. 2 shows an exemplary system 200 for presenting video content to a visually impaired person, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
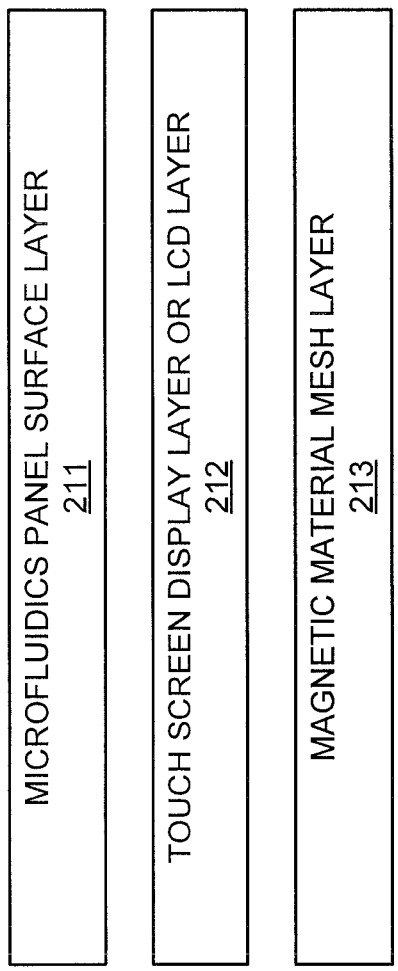
FIG. 3 shows different layers of the display device 210 of FIG. 2, in accordance with an embodiment of the present principles.

Also, it is to be appreciated that display device 210 described below with respect to at least FIGS. 2 and 3 is a device for implementing respective embodiments of the present principles. Part or all of processing system 100 may be implemented in one or more of the elements of display device 210.

Figure 4:
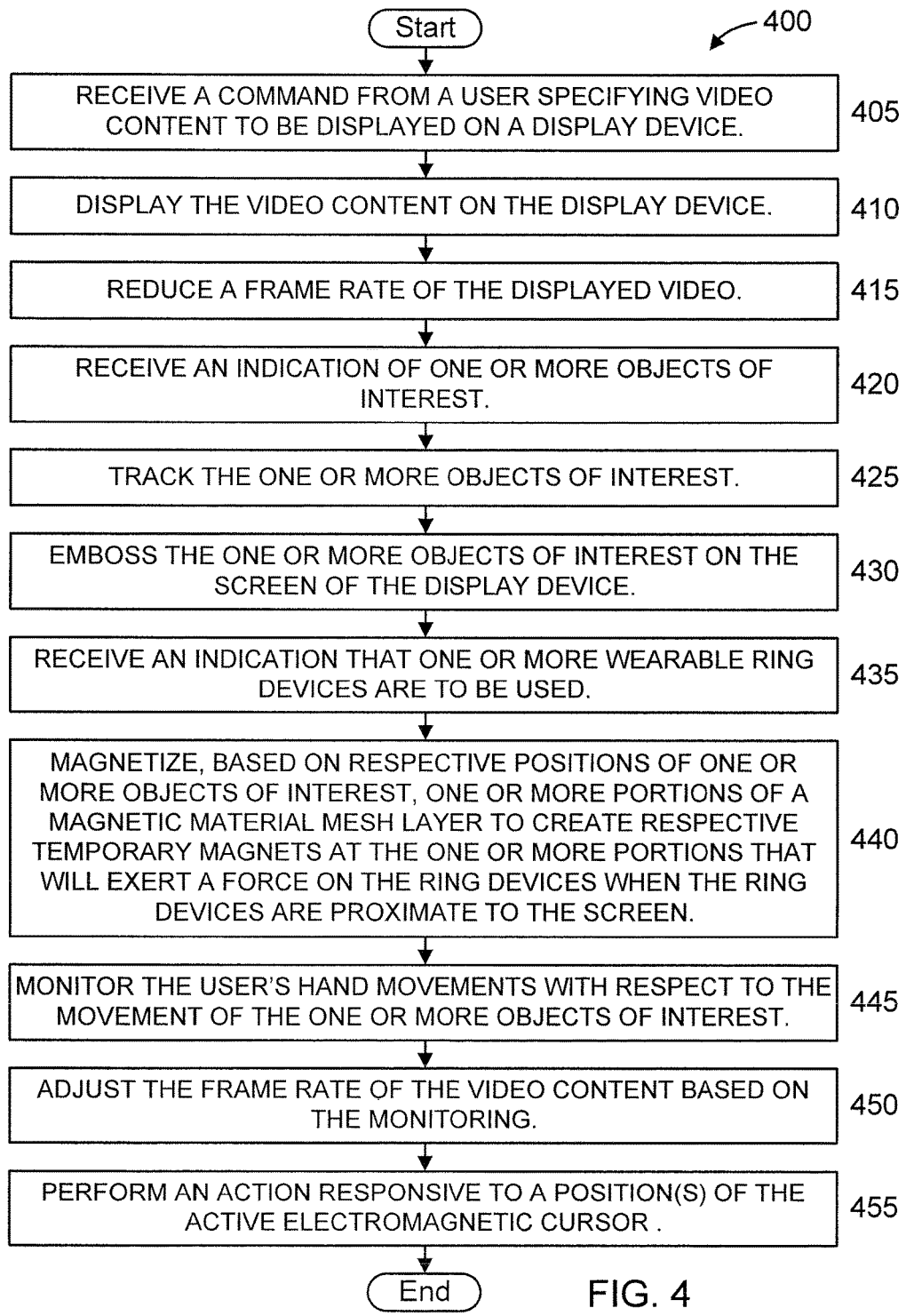
FIG. 4 shows an exemplary method 400 for presenting video content to a visually impaired person, in accordance with an embodiment of the present principles.

Further, it is to be appreciated that processing system 100 may perform at least part of the method described herein including, for example, at least part of method 400 of FIG. 4. Similarly, part or all of system 200 may be used to perform at least part of method 400 of FIG. 4.

FIG. 2 shows an exemplary system 200 for presenting video content to a visually impaired person, in accordance with an embodiment of the present principles.

The system 200 includes a display device 210 and one or more ring devices 220.

The display device 210 can include one or more of at least the following three layers in order to present video content to a visually impaired user: a microfluidics panel display layer 211; a touch screen or Liquid Crystal Display (LCD) layer 212; and a magnetic material mesh layer 213. These layers are further described below with respect to FIG. 3.

The display device 210 can also include a video processor 214 and corresponding memory 215. The video processor 214 can be used to, for example, process user commands, identify objects of interest, track (e.g., location, speed, etc.) objects of interest, and so forth. Further, the video processor 214 can be used to control the various layers (e.g., layers 211-213) of the display device 210. Moreover, the display device 210 can include a microphone 216 and a speaker 217. The microphone 216 can be used to receive voice commands from a user, and so forth. The speaker 217 can be used to query the user, to confirm receipt of a voice command, and so forth. Of course, the display device 210 can include other elements, as readily appreciated by one of ordinary skill in the art given the teachings of the present principles provided herein, while maintaining the spirit of the present principles. For example, devices such as wireless and/or wired network adapters can be included in order to enable video content to be readily provided to the display device 210. Some exemplary devices that can be included in display device 210 are shown and described with respect to the processing system 100 of FIG. 1

The ring devices 220 are constructed of a magnetic material and provide a way for the wearer (user) to ascertain the direction of movement of a digital object(s) depicted on the display device 210. For example, in an embodiment, the user wears at least one ring device 220 on his/her hand(s). The display device 210 emits a directional force indicating a direction of movement of a digital object depicted on the display device 210 and associated with the directional force. This directional force is then detected by the ring devices 220 in order to allow the user to determine the direction of movement of the digital object depicted on the display device 210 and associated with the directional force.

Figure 8:
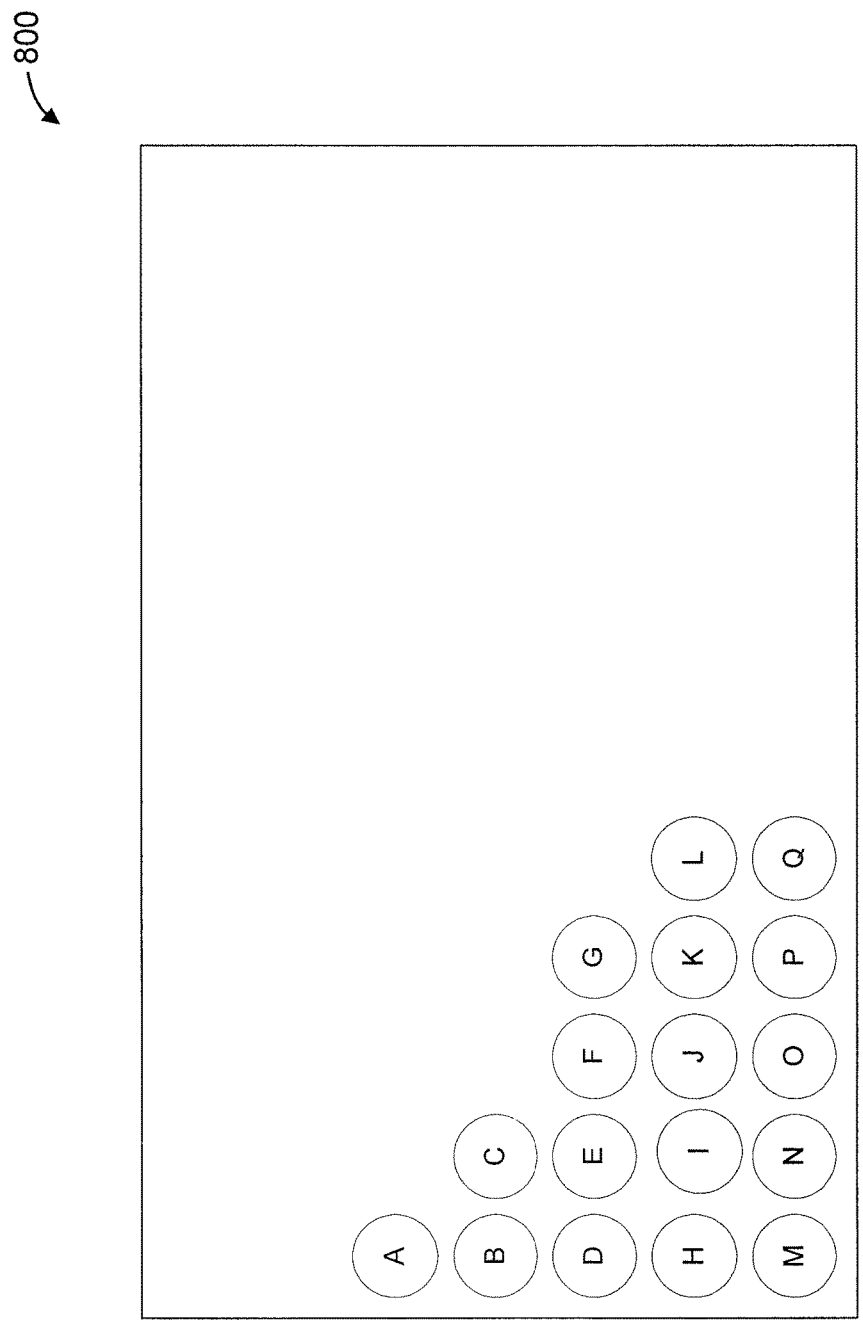
FIG. 8 shows a magnetic pixel (mixel) interface 800 with an active electromagnetic cursor 810, in accordance with an embodiment of the present principles.
Figure 9:
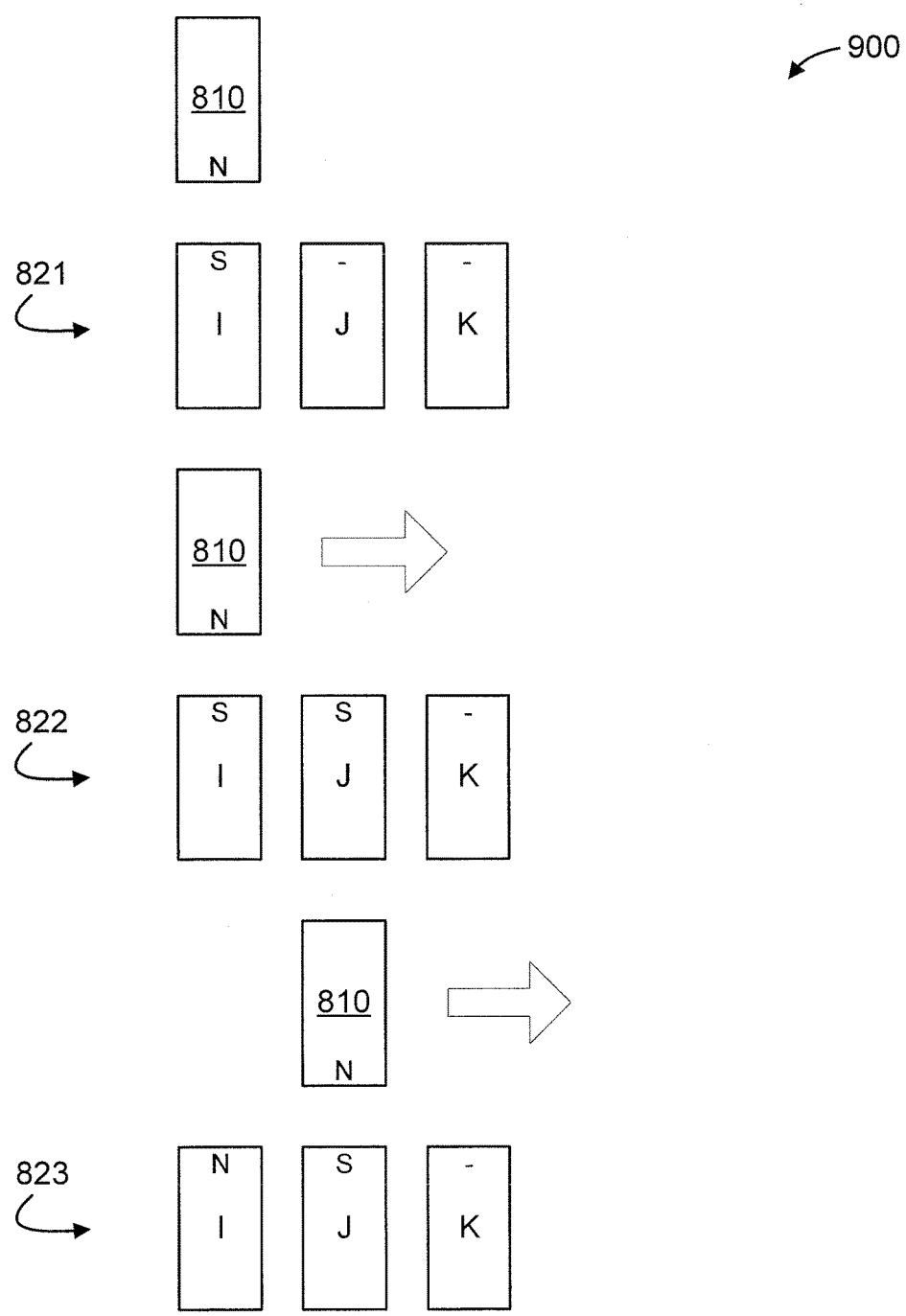
FIG. 9 shows a movement operation 900 using the mixel interface 800 and active electromagnetic cursor 810 of FIG. 8, in accordance with an embodiment of the present principles.
Figure 10:
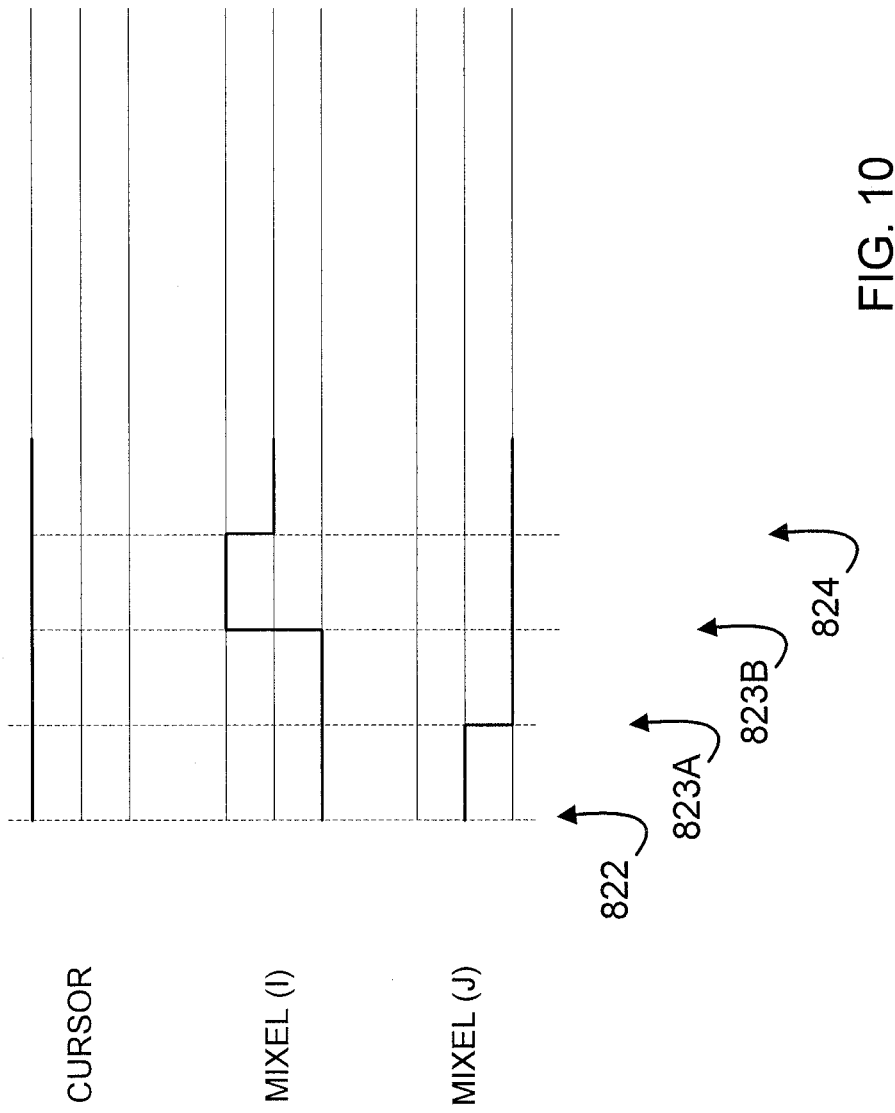
FIG. 10 shows a current diagram 1000 for the movement operation 900 of FIG. 9, in accordance with an embodiment of the present principles.

In an embodiment, one of the ring devices 220, or another magnetic device, can function as an active electromagnetic cursor as described further with respect to FIGS. 8-10. For example, an action can be performed (select an object, etc.) responsive to positions of the active electromagnetic cursor with respect to a screen of the display device 210. In this way, the user can interact with the display device 210 using a cursor.

It is to be appreciated that while processor 214 is described above with respect to performing tracking and other functions relating to the present principles, in another embodiment, other separate elements can be used. For example, a tracking device, an object of interest manager device, and so forth can be used in place of processor 215, while maintaining the spirit of the present principles. These and other variations to system 200 are readily determined by one of ordinary skill in the art given the teachings of the present principles provided herein, while maintaining the spirit of the present principles.

FIG. 3 shows different layers of the display device 210 of FIG. 2, in accordance with an embodiment of the present principles. The display device 210 includes, in order starting from closest to a hand(s) of a user: the microfluidics panel surface layer 211; the touch screen display layer or Liquid Crystal Display (LCD) layer 212; and the magnetic material mesh layer 213. Thus, layer 211 will be closest to the hand(s) of a user, while layer 213 will be the farthest, from among layers 211-213. While primarily described with respect to a moving object(s), the capabilities of the display device can be exploited for any object of interest identified by the user or the system.

The touch screen display layer or LCD layer 212 displays the video content.

The microfluidics panel surface layer 211 embosses a moving object(s) depicted on layer 212. The moving object(s) is embossed by using fluid pressure to raise the surface of this layer 212.

Once the position of the object is detected, appropriate magnetic material in the magnetic material mesh layer 213 can be converted into a temporary magnet so that the user feels the pull force in his/her ring device(s). In this way, the user can understand where the object is moving, and user can follow the object as the object is embossed on the microfluidics panel surface layer 211.

FIG. 4 shows an exemplary method 400 for presenting video content to a visually impaired person, in accordance with an embodiment of the present principles.

At step 405, receive a command (e.g., a voice command) from a user specifying video content to be displayed on a display device that is enabled in accordance with the present principles (e.g., display device 210 in FIG. 2). For example, step 405 can involve receiving a command such as "display a soccer game" from the user.

At step 410, display the video content on the display device. Step 410 can include displaying the video content on a touch screen display layer or LCD layer (e.g., layer 312 in FIG. 3) of the display device.

At step 415, reduce a frame rate of the displayed video. In an embodiment, step 415 is performed automatically (e.g., once any video content is displayed, or when one or more displayed objects are moving, and so forth). In an embodiment, step 415 is performed in response to a user input (e.g., but not limited to, a voice command). In this way, the subsequent actions taken to allow the user to ascertain the video content are more easily processed by the user. In an embodiment, step 415 can be performed at any time, for example, by the user issuing a command (e.g., a voice command) to adjust (increase or decrease) the frame rate.

At step 420, receive an indication of one or more objects of interest. In an embodiment, step 420 involves a user specifying the one or more objects of interest (e.g., using voice commands). In an embodiment, step 420 involves the system automatically specifying one or more objects of interest. In an embodiment, a pre-configuration can be used to identify the one or more objects of interest. The basis for specifying the one or more objects of interest can include, but is not limited to, the type of video content being displayed, a motion of the one or more objects, any characteristic of the one or more objects, and so forth.

At step 425, track the one or more objects of interest. In an embodiment, step 425 can involve tracking the position and speed of the one or more objects of interest.

At step 430, emboss the one or more objects of interest on the screen of the display device. In an embodiment, step 430 can involve embossing the one or more objects of interest using a microfluidics panel surface layer (e.g., layer 311 in FIG. 3) of the display device. For example, based on the position and speed of the one or more objects of interest, pressure will be applied in the microfluidics panel surface layer to emboss the one or more objects of interest on the screen of the display device. In an embodiment, the dimension of the objects being embossed will be the same as the objects as they would be depicted on the screen. In an embodiment, the dimensions can be varied (e.g., in a manner to make them stand out further when the objects are felt via the microfluidics panel surface layer). As a result of step 430, the user will be able to feel objects, including moving objects, embossed on the screen of the display device.

At step 435, receive an indication that one or more wearable ring devices are to be used. Step 435 can involve simply removing the wearable ring devices from a particular location or some other implicit indication (e.g., simply putting them on, where their motion as opposed to being at rest, provides the implicit indication), or can involve providing an explicit indication that the ring devices are to be used (e.g., using an utterance issued by the user).

At step 440, magnetize, based on respective positions of one or more objects of interest, one or more portions of a magnetic material mesh layer (e.g., layer 313 in FIG. 3) to create respective temporary magnets at the one or more portions that will exert a force on the ring devices when the ring devices are proximate to the screen of the display device. As a result of step 440, a user will be able to ascertain the direction of movement of the objects of interest on the screen of the display device.

At step 445, monitor the user's hand movements with respect to the movement of the one or more objects of interest. The monitoring is performed to determine the usage pattern by the user, that is, the degree of synchronization between the user's hand movements with respect to the movement of the one or more objects of interest. The monitoring can also be performed to monitor a position of an active electromagnetic cursor. The active electromagnetic cursor can be used by the user to move and/or select items displayed on the screen of the display device.

At step 450, adjust the frame rate of the video content based on an output of the monitoring initiated/performed in step 445. For example, if the monitoring step indicates a lack of synchronization between the user's hand movements with respect to the movements of the one or more objects of interest, then the frame rate is reduced to better allow the user to follow the movements of the one or more objects of interest. On the other hand, if a high degree of synchronization is indicated, then the frame rate may be increased or maintained.

At step 455, perform an action responsive to a position(s) of the active electromagnetic cursor monitored at step 445.

Figure 5:
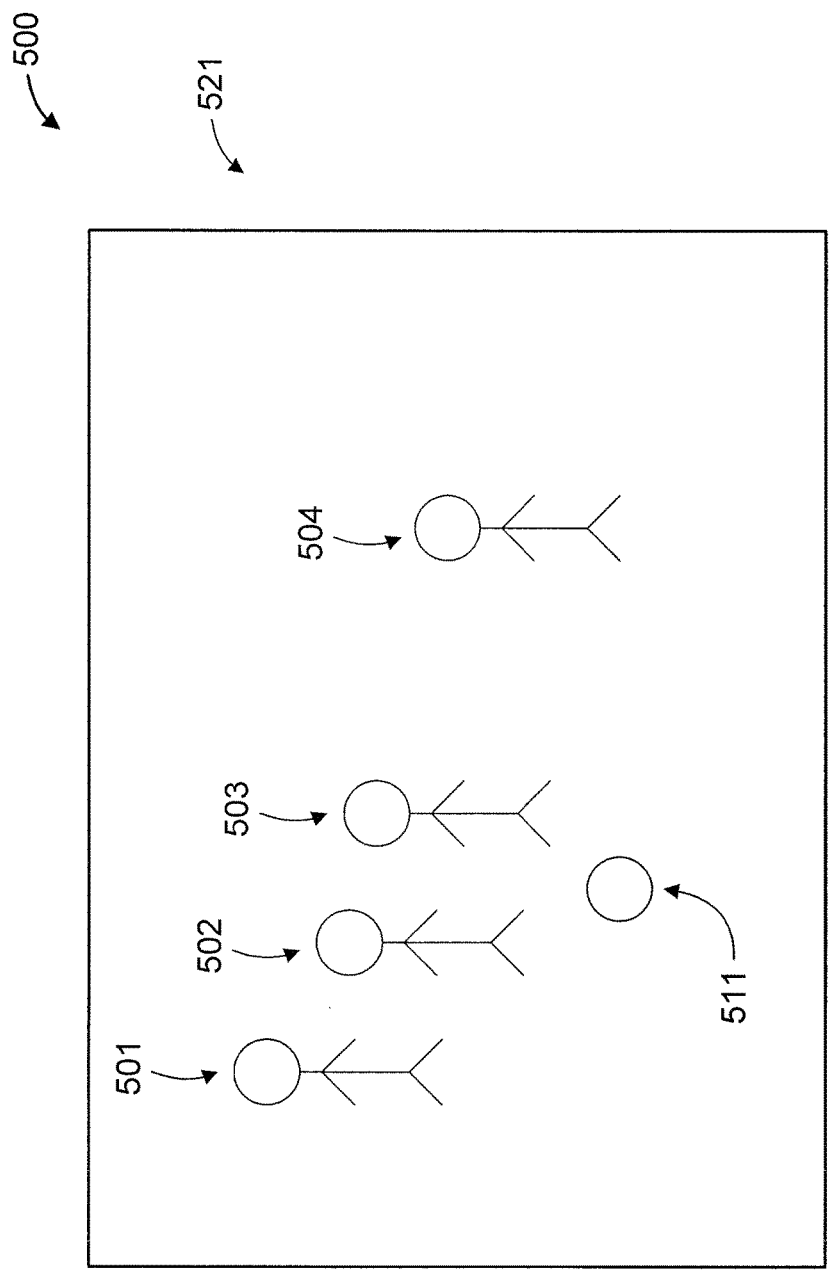
FIG. 5 shows an exemplary image 500 for display to a visually impaired person, in accordance with an embodiment of the present principles.

FIG. 5 shows an exemplary image 500 for display to a visually impaired person, in accordance with an embodiment of the present principles. The image 500 depicts four soccer players 501, 502, 503, and 504 vying for a soccer ball 511 on a soccer field 521. In the embodiment, one or more objects of interest can be selected by the user or automatically determined. In the former case, the user can select/define one or more objects of interest using voice commands. In the latter case, moving objects can be identified and serve as an object of interest. In either case, the display device can recognize the image object boundary.

In an embodiment, all moving objects in the image 500 are selected as objects of interest. Thus, the four soccer players 501-504, as well as the soccer ball 511, are embossed on the screen of a display device, while the soccer field 521 is not embossed. In this way, the user can "feel" the respective movements of the players 501-504 and the soccer ball 511.

Figure 6:
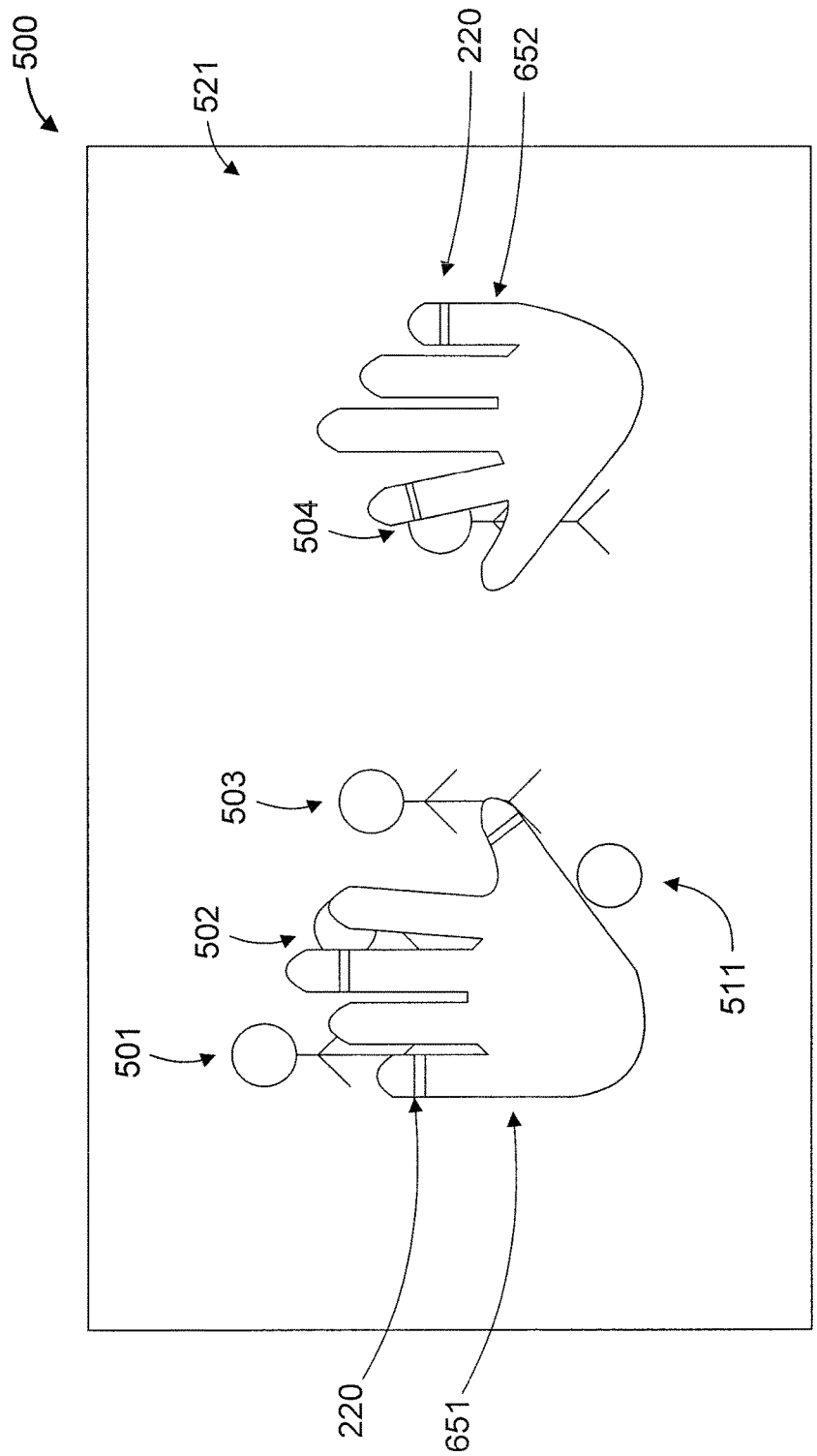
FIG. 6 shows the image 500 of FIG. 5 with the user holding his/her hands over or on the screen of the display device, in accordance with an embodiment of the present principles.

FIG. 6 shows the image 500 of FIG. 5 with the user holding his/her hands 651 and 652 over or on the screen of the display device, in accordance with an embodiment of the present principles. In the embodiment of FIG. 6, the user is wearing multiple ring devices 220 on the fingers of his/her hand. Thus, the user can feel the players 501-504 and the soccer ball 511 embossed on the screen of the display device and can also feel the movement of the players 501-504 and the soccer ball 511 from the pull exerted on the multiple ring devices 601 as the players 501-504 and the soccer ball 511 move around. In an embodiment, one of the multiple ring devices 220 can be an active electromagnetic cursor. The electromagnetic cursor is further described with respect to FIGS. 8-10. It is to be appreciated that while more than one ring device 220 is shown on each hand in the embodiment of FIG. 6, any number of rings can be used including only one per hand or only on one hand, while maintaining the spirit of the present principles.

Figure 7:
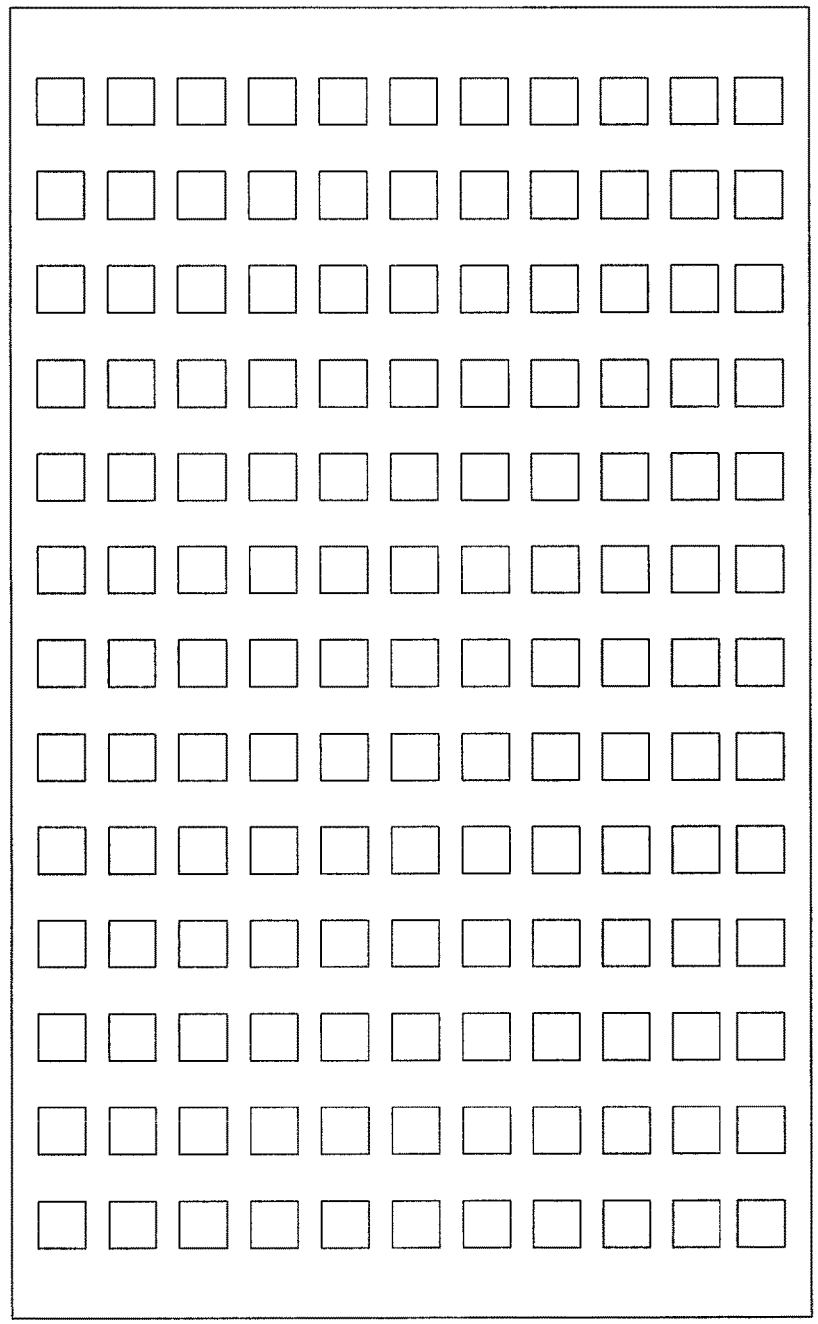
FIG. 7 further shows the magnetic material mesh layer 213 of FIG. 3, in accordance with an embodiment of the present principles.

FIG. 7 further shows the magnetic material mesh layer 213 of FIG. 3, in accordance with an embodiment of the present principles.

Based on the relative position of a moving object(s) on the screen, an appropriate portion(s) of magnetic material from the magnetic material mesh layer 213 will be identified, and electricity will be supplied to that portion(s) to convert the corresponding magnetic material into a temporary magnet. The temporary magnetic will create a pull force on the ring(s) of the user to enable the user to ascertain the position of the moving object that is embossed on the screen.

For the sake of illustration, the mesh layer 213 is shown in FIG. 7 superimposed over the image 500 of FIG. 5 that is presented on the screen of a display device. However, as appreciated by one of ordinary skill in the art, the mesh layer 213 is not actually visible to a person having the sense of sight when looking at the screen of the display device. The depiction of the mesh layer 213 in FIG. 7 is to illustrate one possible implementation of magnetic material mesh layer in accordance with the present principles. Thus, other grid configurations can also be used, while maintaining the spirit of the present principles.

FIG. 8 shows a magnetic pixel (mixel) interface 800 with an active electromagnetic cursor 810, in accordance with an embodiment of the present principles.

The mixel interface 800 corresponds to, and includes, the magnetic material mesh layer 213 of FIG. 3. The mixel interface 800 reacts to the active electromagnetic cursor 810 in order for the user to be able to interact with the mixel interface 800 using the active electromagnetic cursor 810.

FIG. 9 shows a movement operation 900 using the mixel interface 800 and active electromagnetic cursor 810 of FIG. 8, in accordance with an embodiment of the present principles. It is to be appreciated that the labeling convention used to label positions in the mixel interface 800 are merely illustrative and, thus, other labels and other labeling configurations (spacings, arrangements, etc.) can also be used in accordance with the teachings of the present principles, while maintaining the spirit of the present principles.

The movement operation 900 is to move the active electromagnetic cursor 810 from a position (I) to a position (J), that is, to move the active electromagnetic cursor 810 from its current position (I) to the position (J) that is to the immediate right of position (I).

In an initial state 821, the active electromagnetic cursor 810 is fixated over position (I).

In a prepare-for-movement state 822, the active electromagnetic cursor 810 is prepared to be moved.

In a movement state 823, the active electromagnetic cursor 810 is moved from its current position (I) to position (J).

FIG. 10 shows a current diagram 1000 for the movement operation 900 of FIG. 9, in accordance with an embodiment of the present principles.

The current diagram 1000 shows the current 1011 for the cursor, the current 1012 for the mixel at position (I), and the current 1013 for the mixel at position (J).

In the initial state 821, the active electromagnetic cursor 810 is fixated over position (I).

During a first part 823A of the movement state 823, the user begins to move the cursor 810 from position (I) to position (J), and the following applies: the cursor has a North-pole configuration (N); position (I) has a South pole orientation (S), position (J) is activated to have the South pole orientation (S).

Thereafter, during a second part 823B of the movement state 823, the current for position (I) is reversed, changing its magnetic pole orientation to a North pole orientation, and thus causing a repelling action with respect to the active electromagnetic cursor 810.

After the movement state 823 (indicated in FIG. 10 by the reference numeral 824), the active electromagnetic cursor 810 has moved to position (J), and the current at position (I) is deactivated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for presenting video content to a user, comprising:
   displaying the video content on a visual display layer of a display device;
   tracking, by a video processor, at least one object of interest in the video content;
   embossing, based on respective positions of the at least one object of interest, the at least one object of interest on a microfluidics panel surface layer of the display device;
   magnetizing, based on the respective positions of the at least one object of interest, one or more portions of magnetic material in a magnetic material mesh layer of the display device to create respective temporary magnetics at the one or more portions that emit respective magnetic fields detectable by at least one user-wearable magnetic ring device configured to be circular and worn on a finger, held proximate to the display device, the respective magnetic fields indicating at least a movement of the at least one object of interest; and
   tracking the at least one user-wearable magnetic ring device configured as an active electromagnetic cursor by the display device, wherein the display device tracks the active electromagnetic cursor relative to a grid formed by the magnetic material in a magnetic material mesh layer, and performs an action relating to the at least one object of interest responsive to one or more movements of the active electromagnetic cursor.

2. The method of claim 1, wherein the at least one magnetic ring device is worn on at least one hand of the user.

3. The method of claim 1, wherein the respective magnetic fields indicate the movement of the at least one object of interest by indicating a speed and a direction of movement of the at least one object of interest.

4. The method of claim 1, further comprising, by at least the video processor:
   monitoring hand movements of the user with respect to a movement of the at least one object of interest;
   determining a usage pattern of the user with respect to tracking the movement of the at least one object of interest; and
   adjusting a frame rate of the video content being displayed responsive to the usage pattern.

5. The method of claim 1, wherein the visual display layer comprises a touch screen display layer or a Liquid Crystal Display layer.

6. The method of claim 1, further comprising adjusting, by the video processor, a frame rate of the video content to coincide with a movement of at least one hand of the user.

7. The method of claim 1, wherein said tracking step comprises tracking a position and a speed of the at least one object of interest.

8. The method of claim 1, wherein said magnetizing step comprises applying current to the one or more portions of magnetic material to create the respective temporary magnetics at the one or more portions of magnetic material.

9. The method of claim 1, wherein said magnetizing step comprises adjusting a magnetic force provided by the one or more portions of magnetic material responsive to a speed of the at least one object of interest.

10. A non-transitory article of manufacture tangibly embodying a computer readable program which when executed causes a computer to perform the steps of claim 1.

11. A system for presenting video content to a user, comprising:
    a display device,
    wherein the display device includes:
      a visual display layer for displaying the video content thereon;
      a video processor for tracking at least one object of interest in the video content;
      a microfluidics panel surface layer for embossing the at least one object of interest thereon based on respective positions of the at least one object of interest; and
      a magnetic material mesh layer formed of magnetic material such that one or more portions of the magnetic material is magnetized based on the respective positions of the at least one object of interest to create respective porary magnetics at the one or more portions that emit respective magnetic fields, the respective magnetic fields indicating at least a movement of the at least one object of interest,
    wherein the system further includes a user wearable magnetic ring device for detecting the respective magnetic fields when held proximate to the display device;
    tracking the at least one user-wearable magnetic ring device configured as an active electromagnetic cursor by the display device, wherein the display device tracks the active electromagnetic cursor relative to a grid formed by the magnetic material in a magnetic material mesh layer, and performs an action relating to the at least one object of interest responsive to one or more movements of the active electromagnetic cursor; and
    wherein each of the at least one magnetic ring device is configured to be circular and worn on a finger.

12. The system of claim 11, wherein the at least one magnetic ring device is formed to be worn on at least one hand of the user.

13. The system of claim 11, wherein the respective magnetic fields indicate the movement of the at least one object of interest by indicating a speed and a direction of movement of the at least one object of interest.

14. The system of claim 11, wherein at least the video processor monitors hand movements of the user with respect to a movement of the at least one object of interest, determines a usage pattern of the user with respect to tracking the movement of the at least one object of interest, and adjusts a frame rate of the video content being displayed responsive to the usage pattern.

15. The sytem of claim 11, wherein the visual display layer comprises a touch screen display layer or a Liquid Crystal Display layer.

16. The system of claim 11, wherein the video processor adjusts a frame rate of the video content to coincide with movement of at least one hand of the user.

17. The system of claim 11, wherein the video processor tracks a position and a speed of the at least one object of interest.

18. The system of claim 11, wherein a magnetic force provided by the one or more portions of magnetic material is adjusted responsive to a speed of the at least one object of interest.

* * * * *